United States Patent
Seitz et al.

[15] 3,683,589
[45] Aug. 15, 1972

[54] HELIUM PURIFIER

[72] Inventors: Charles A. Seitz; Winston M. Bodine, both of Amarillo, Tex.

[73] Assignee: The United States of America as represented by the Secretary of the Interior

[22] Filed: Sept. 8, 1970

[21] Appl. No.: 70,136

[52] U.S. Cl. ..........................55/62, 55/66, 55/208, 62/18, 62/40
[51] Int. Cl. .........................B01d 53/04, F25z 3/00
[58] Field of Search......55/62, 66, 74, 179, 208, 387, 55/162; 62/18, 40

[56] References Cited

UNITED STATES PATENTS

| | | | |
|---|---|---|---|
| 3,415,069 | 12/1968 | Hausen | 62/40 |
| 3,085,379 | 4/1963 | Kiyonaga et al. | 55/62 |
| 3,243,938 | 4/1966 | Lavery et al. | 55/62 |

*Primary Examiner*—Charles N. Hart
*Attorney*—Ernest S. Cohen and Gersten Sadowsky

[57] ABSTRACT

A continuous production and delivery of ultrapure helium involving dual adsorption columns is characterized by a helium purifying operation in one of the columns concurrently with preparation for such operation in the other column by regeneration and pressurization of the adsorbent. A pair of the helium product is utilized upon delivery from one column to purge impurities from the other column and pressurize its adsorbent. Continuous cycling of the sequence of helium purification alternating with an application of heat, together with a restricted flow of purging helium for column regeneration and pressurization, is coordinate for the respective columns by operation of a time regulated program control.

10 Claims, 4 Drawing Figures

INVENTORS
CHARLES A. SEITZ
WINSTON M. BODINE
Ernest S. Cohen
BY Gersten Sadowsky
ATTORNEYS INVENTORS
CHARLES A. SEITZ
WINSTON M. BODINE
BY Ernest S. Cohen
Gersten Sadowsky
ATTORNEYS

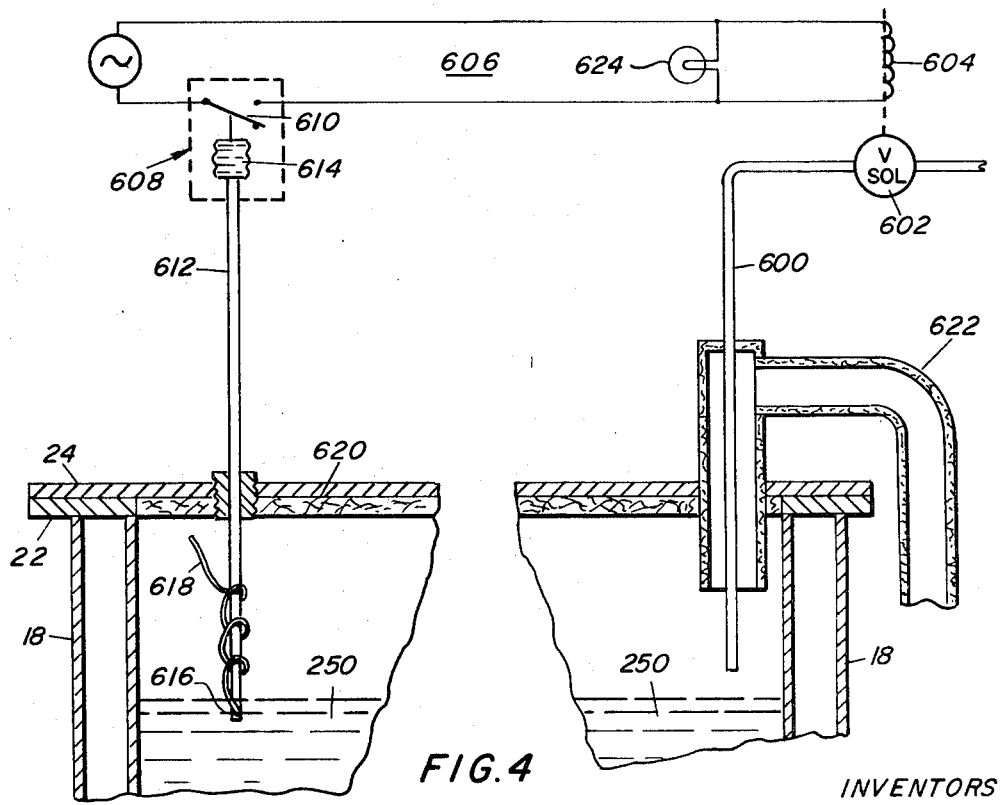

HELIUM PURIFIER

The invention relates to a method and apparatus for producing ultrapurified helium having its impurities reduced to a less than 1 part per billion (ppb). Helium of standard quality, or Grade A helium, having about 20 parts per million (ppm) total impurities must be improved for certain scientific uses such as a coolant medium in nuclear reactors, an inert blanketing gas for crystal growing, and a carrier gas for helium ionization chromatographic analyzers. Combinations or trains of known helium purification procedures which remove individual impurities, such as oxygen by reaction with alkali metals, nitrogen by reaction with heated titanium, zirconium or uranium, and hydrogen by diffusion through palladium or oxidation with catalysts, are not practical for a continuing production of purified helium. A known scheme of helium purification in which all impurities are removed at one time is dependent on the permeation of helium through quartz at a higher rate than all the other impurities. However, this scheme does not necessarily produce ultrapure helium since the resultant mixture contains hydrogen and neon which are known to pass through quartz in significant amounts. These attempts, and others to enhance the purity of helium, such as using organic membranes in series, have not satisfactorily produced an ultrapure helium, and entail high costs of heating, or recompression, or both.

High purity helium can be obtained by the regasification of filtered helium taken from beneath the surface of liquid helium. However, purification of helium by first cooling it to 4.2° K is an expensive method for application to continuous production. Known methods of purifying helium utilizing highly activated adsorbents at low temperatures, as presently practiced on a commercial scale, do not furnish an ultrapure helium since the impurity neon is allowed to pass through the appertaining adsorbent beds virtually unchanged in concentration. Purification of helium by adsorption can be made more efficient by reducing the adsorbent temperature from 77° K of liquid nitrogen, by means of a helium refrigerator, to a lower temperature whereat neon and all other impurities are reduced below detectable limits. However, the cost of helium refrigeration is relatively high and equipment for carrying out this type of purification is relatively scarce. Distinguishing the present invention from the methods heretofore noted is the use therein of an adsorbent material at the temperature of liquid nitrogen to make possible a continuous operation producing ultrapure helium. Moreover, the invention can be safely kept in production for extended periods of time with only periodic observations by an operator, and remains reasonably efficient in the utilization of both helium and cryogen.

Apparatus according to the invention operates automatically to deliver a continuous stream of purified helium. This operation importantly involves a two part purification instrumentality of the apparatus having in each of its parts an adsorbent material generally filling an enclosure positioned under an inverted container forming an insulator shroud. Gas periodically trapped under this shroud constituting it a superior heat shield makes possible dual temperature operations which lie at the heart of the invention. Both parts are adapted to function together suspended within liquid nitrogen, each operating in turn out-of-phase as a low temperature helium purifier and as a relatively high temperature regenerator of the absorbent material contained therein. More specifically, the respective shrouds communicate through separate valved conduit systems which at appropriately timed intervals in an operational sequence of the invention cause liquid nitrogen to be forced out from within the confines of one shroud, and away from the enclosure thereunder, and replaced by nitrogen gas which allows a higher temperature for regeneration of the enclosed adsorbent material. Further, since a purification operation in one part of the apparatus continues while regeneration of adsorbent material occurs in the other part, purified helium in the apparatus is available as a requisite gas for purging in carrying forward the regeneration of the other part enclosure, as well as repressuring this enclosure when it is subsequently recooled. Continuous cyclic operation of the apparatus which enables uninterrupted productive operation is predetermined by the setting of a program control mechanism employing timer driven cam actuators for switches in energizing circuits to valve actuating solenoids and heaters cooperatively associated with the respective enclosures.

A principal object of present invention is therefore to provide a practical method of producing ultrapure helium which is both economical and reliable.

A further object of the invention is to provide a simplified apparatus uniquely adapted to produce an ultrapure gas.

A still further object of the invention is to provide an automatically controlled apparatus which is continuously operable for producing a steady supply of ultrapure helium.

These and other objects and advantages of the invention will become more fully apparent from the following detailed description of the invention set forth herein and from the accompanying drawing made a part hereof, in which.

FIG. 3 is a time cycle chart illustrating a program of operational sequences assigned to components of the invention controlling fundamental functions thereof; and FIG. 4 is a cross-sectional and in part schematic representation of a portion of the apparatus shown as having in association therewith a refrigerant level sensor and circuitry responding thereto for controlling a refrigerant filling mechanism.

Figure 1:
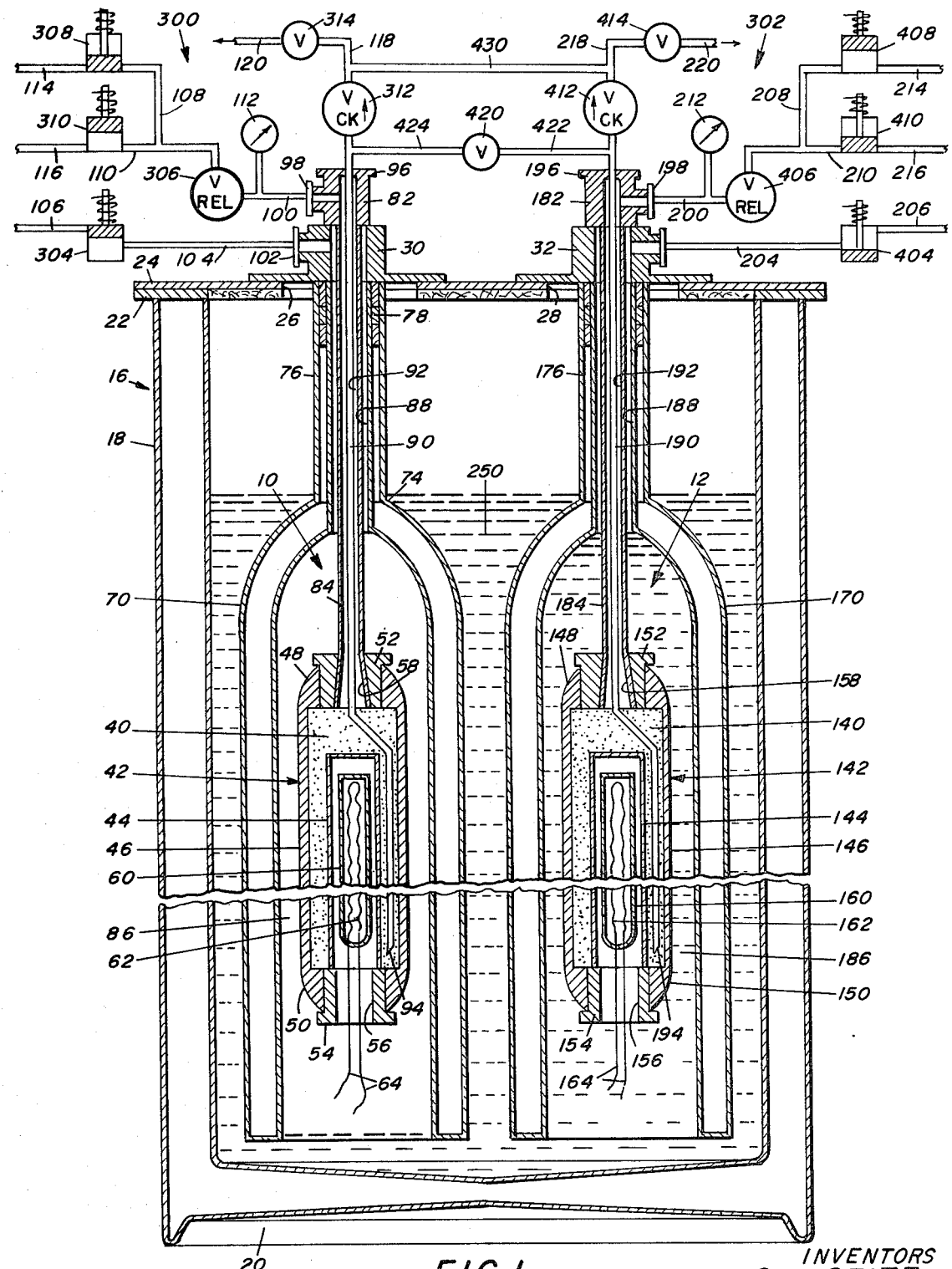
FIG. 1 is a sectional view, which is partly schematic, showing the overall arrangement constituting a purification apparatus according to the present invention.

Dual purifier columns 10 and 12 employed in a preferred apparatus according to the invention, as shown in FIG. 1, are arranged for operation in a drum-like tank assembly 16. An evacuated double wall, stainless steel construction used in fabricating a container part 18 of tank assembly 16, obtains therefor the insulation properties of a dewar vessel. Container 18 is recessed at its bottom so as to create a double thickness peripheral portion providing a support edge for a base 20 of the apparatus. A flat upper peripheral edge of container 18 has welded thereto a flat flanged collar 22 wherein a tank cover plate 24 is adapted to be positioned by alignment of its edge with that of the collar and secured tightly by flange bolts or clips. Cover 24 is characterized by a pair of access holes 26 and 28 having a symmetrical disposition on the cover which situates each hole centrally over a respective one-half of the space within container 18. Flanged tee fittings 30 and 32 are positioned to cover holes 26 and 28, respectively, such that their flanges are conveniently securable to the upper surface of cover plate 24. Internally threaded openings in fittings 30 and 32 have secured therein further fittings from which purifier columns 10 and 12, respectively, and their appurtenances, depend so as to be maintained within separate halves of container 18 out-of-contact with the container and each other.

The aforementioned purifier columns are essentially tubular structures which, when filled with an adsorbing material, will cause either permanent or temporary retention of the impurities in a gas fed therethrough so as to cause a temporary decrease or elimination of these impurities from the gas as discharged from the purifier. Since the respective purifier columns of the present invention together with the valving arrangements therefor are in essence structurally and functionally identical, a detailed description thereof is, in general, given with reference to purifier column 10. An adsorbent agent, comprising activated coconut charcoal 40, is confined within a capsule-like canister 42, which can be conveniently made of stainless steel. An extended, thin-walled tubular casing 44 axially disposed within canister 42, constituting a thermowell therein, is open at the bottom end thereof. The cylindrical elongation 46 of canister 42 merges at the extremities thereof with hemispherical end sections 48 and 50 which have internally threaded holes through central thickened parts thereof. Fastened in the holes of sections 48 and 50 are flanged, threaded closure caps 52 and 54, respectively. Closure cap 54 is axially traversed by a passage 56 having secured to the inner opening thereof the rim of the open end of tubular casing 44. Cap 54 thus maintains casing 44 concentrically oriented with respect to canister 42, and disposes the closed end of the casing spaced a short distance from the inner opening of a passage 58 centrally traversing closure cap 52. As was hereinbefore indicated, casing 44 houses a heater unit 60 wherein a resistance wire 62 is extended from connections to electrical leads 64 which traverse cap passage 56 and extend out of the apparatus, through appropriate fittings in cover 24, to a heat controller device 540 appearing in FIG. 2.

Canister 42 is held centrally positioned under an enveloping insulator structure comprising a shroud 70. Double wall stainless steel shells forming shroud 70 seal in evacuated space so as to provide an insulating partition which appears in FIG. 1 as a domed cylinder having an open bottom. Above an axial necked-in section 74 of shroud 70 rises a vertical conduit 76 thereof which is engaged to a lower opening of tee fitting 30 by a fluid tight coupling 78 screwed into the fitting opening and onto a threaded end of conduit 76. In an upper opening of fitting 30 is secured a reducer tee fitting 82 from which canister 42 is suspended by its connection to a conduit 84 attached to the fitting. These connections are effected by securing an upper rim portion of conduit 84 in a lower opening of fitting 82, and a lower rim portion of the conduit in the outer opening of closure cap passage 58. By thus suspending canister 42 within shroud 70 there is enclosed an annular space 86 which provides an appreciable separation between these parts. Moreover, conduit 84 is thereby located concentrically within conduit 76 to define an annular space 88 therebetween. Also placed in concentric relationship with conduit 84 is an upper extension of a further conduit 90 which extends through conduit 84 to define a still further annular space 92 therebetween. A lower extension of conduit 90 passes down into canister 42, and traverses charcoal 40 so as to place an open end 94 thereof in the charcoal adjacent the bottom of the canister. As is now evident with further reference to FIg. 1, conduit 90 provides by its upper and lower extensions, and an inclined bridging part thereof situated above casing 44, a continuous passage for flow from above a coupling cap 96 in fitting 82 to opening 94 of the conduit. A further coupling cap 98 is provided to secure an exterior conduit 100 to a further opening in fitting 82 and thereby facilitate fluid communication between conduit 100 and the interior of canister 42 by way of the flow passage in fitting 82 and annular space 92 in conduit 84. Similarly a coupling cap 102 secures an exterior conduit 104 to fitting 30, and facilitates a fluid communication between conduit 104 and annular space 86 in shroud 70 by way of the flow passage in fitting 30 and annular space 88 in conduit 76.

As was previously indicated, parts identified with respect to purifier column 10 find their counterparts in purifier column 12. In brief, column 12 includes an adsorbent agent of activated coconut charcoal 140 confined in a canister 142 comprised by an extended cylindrical shell 146 which at its opposite ends becomes hemispherical in parts 148 and 150, respectively. Closure caps 152 and 154, secured in axially aligned end openings of the canister, have axial passages 158 and 156 therein which open within the canister at the upper and lower ends thereof, respectively. A tubular casing 144 axially disposed within the canister contains a heater unit 160 wherein an extended resistance wire 162 has connections 164 to a remote controller 554, appearing in FIG. 2. Tee fitting 32 has secured thereto a reducer tee fitting 182 which in turn has secured in a lower opening thereof a vertically disposed conduit 184. Canister 142 is vertically positioned in container 18, level with canister 42, by suspension from conduit 184 attached within a closure cap passage 158 of canister 142. A vacuum jacketed insulating shroud 170, open at its bottom, comprises an upper conduit part 176 which by its attachment in a lower opening of fitting 32 suspends the shroud to envelop canister 142. Provisions to channel gas which has been purified, in a manner to be hereinafter more fully explained, from a lower part inside canister 142 to outside column 12, includes a further conduit 190 which rises through canister 142 from its opening 194 in the aforesaid lower part and extends axially within conduit 184 to emerge above a coupling cap 196 secured in a upper opening of fitting 182. A fluid channel communicating an upper part inside of canister 142 with an exterior conduit 200 coupled in a further opening of fitting 182, is provided in column 12 by way of an annular space 192, defined between conduits 184 and 190, which opens into the fluid passage in fitting 182 leading to conduit 200. A fluid channel communicating an annular space 186 between shroud 170 and canister 142 with an exterior conduit 204, coupled to a further opening in fitting 32, is provided in column 12 through an annular space 188 defined between conduits 176 and 184, which opens into the fluid passage in fitting 32 leading to conduit 204. Accordingly, when properly situated in tank 16, the respective columnar structures, including the shrouds thereof, are spaced away from all surfaces within container 18, and each other, such that requisite surfaces thereof are contacted by liquid nitrogen 250 filling the container to a level reaching slightly above the lower ends of shroud conduits 76 and 176.

Provisions made for supplying liquid nitrogen as required to maintain a proper level in container 18 include a level controller arrangement of the type illustrated in FIG. 4. Nitrogen lost in the procedure to be hereinafter more fully explained, is replenished from an outside source by way of a line 600 in which flow is regulated by a control valve 602. A solenoid 604 is adapted to actuate the valve to open when energized in a power circuit 606 which is completed by closure of a pressure actuated switch 608. Contacts 610 of the switch are operated by pressure change in a bellows unit made up of a stainless steel capillary tubing 612 opening at its top end into a bulb 614. This unit is completely filled through a lower end opening of tubing 612 with methane at atmospheric pressure whereupon the end is crimped, cut, and silver brazed to form a leak proof joint constituting a sensing end 616 for the unit. A relatively thick copper wire 618 is soldered to sensing end 616 and wrapped around the capillary so as to extend upward. A suitable coupling collar set into container cover 24 maintains tubing 612 vertically disposed in the cover with sensing end 616 in contact with liquid nitrogen 250. Since wire 618 is thus situated to reach into the warmer gaseous region of container 18, it forms a thermal conductor to warm sensing end 616 when the liquid nitrogen level drops below this end. The top of bulb 614 is mechanically linked to the switch arm of contacts 610 so as to drive the arm to close the contacts when the bulb expands. The switch is adjusted by inserting sensing end 616 into liquid nitrogen and turning an adjustment screw (not shown) of the bellows structure until the switch contacts open. Since the enclosed methane is a solid at the temperature of liquid nitrogen and changes pressure rapidly with temperature rise above this point, a drop of the liquid nitrogen surface to even a few millimeters below sensing end 616 causes sufficient expansion of bulb 614 to effect completion of energizing circuit 606 at contacts 610. This arrangement is made particularly sensitive by the action of heat sink 618. The resultant opening of valve 602 and the consequent release of liquid nitrogen to supply container 18, raises the level therein to where liquid nitrogen covers sensing end 616. Responsive to the resultant pressure drop in the bellows structure switch contacts 610 reopen in circuit 606, and valve 602 closes. Foam insulation 620 under cover 24, and similar insulation 622 adjacent pipe 600, function in a conventional manner to improve the efficiency of the liquid level controller. A pilot light 624 in circuit 606, operates in the usual way to indicate periods during which liquid nitrogen is supplied to the apparatus.

Apparatus according to the invention further employs in connection with canisters 42 and 142, a valving system for controlling the flow of helium feed input and venting, and a product or purified helium output, and in connection with shrouds 70 and 170, a valving system for filling and venting nitrogen from under the shrouds. Valves also provided include relief valves in the feed input and venting conduits, check and metering valves in product helium conduits, and an adjustable needle valve in a conduit connecting the canisters for facilitating a back flow procedure, to be hereinafter more fully explained. Referring now to FIG. 1, taken together with FIG. 2, the aforesaid valving systems will be seen as comprising separate sets of electrically controlled solenoid actuated valves 300 and 302 which selectively function to coordinate the operations in columnar structures 10 and 12, respectively. A low pressure, solenoid actuated, normally open valve 304, associated with column 10, determines the flow of nitrogen gas from under shroud 70 and through annular space 86, by controlling gas flow from conduit 104 to a nitrogen vent conduit 106. Helium flow to and from the confines of cylinder 42 is effectively channeled through conduit 100 by way of a relief valve 306 wherefrom helium passes into branching conduits 108 and 110 having operable therein solenoid actuated, normally closed valves 308 and 310, respectively. Relief valve 306 is preceded in the line thereto by a pressure gage 112 in a take-off conduit connected to conduit 100. Accordingly, valve 308 is operable to allow flow of a helium feed gas from an input conduit 114, which by way of conduit 108, 110 and 100, enters canister 42, and valve 310 is operable to allow out-flow of a helium gas discharged from canister 42, which by way of conduits 100 and 110, vents through conduit 116. Product helium in conduit 90 flows therefrom by way of a one-way check valve 312 opening into a conduit 118, and exits in a product output conduit 120 under control of a manually operable valve 314.

Solenoid actuated valves 404, 408 and 410 of valve set 302, correspond in form and function to valves comprising set 300. Normally open valve 404 provides a passage wherefrom nitrogen gas arising from under shroud 170, and passing through its annular space 186, further annular space 188, and conduit 204, is vented through conduit 206. Actuation of normally closed valve 408 completes a passage wherein helium feed gas supplied from an input feed conduit 214 flows to canister 142 by way of conduits 208, 210, and 200, and annular space 192. Actuation of normally closed valve 410 completes a passage wherein contaminated helium gas arising from inside canister 142 flows out through annular space 192, and conduits 200 and 210, wherefrom the gas is vented through a conduit 216. Gas flow between conduit 200 and conduits 208 and 210 passes through a relief valve 406, and is monitored by a pressure gage 212. Helium purified by operation of the invention exits canister 142 in conduit 190, wherefrom this helium passes through a check valve 412, a conduit 218 and a manually controlled valve 414, and is supplied to storage or a point of utilization in conduit 220. A directional reversal of gas flow through conduits 90 and 190, which occurs every half cycle in the regular operation of the apparatus, to be hereinafter more fully explained, is facilitated by intercolumnar connection conduits 422 and 424 containing needle valve 420. A conventional needle valve having utility in the preferred embodiment of the invention operates up to a line pressure of 3,000 psi, while allowing the same flow in each direction or at least within ten percent of the set flow in one direction. A further conduit connection 430 between output conduits 118 and 218 allows delivery of purified helium from the respective canisters through either one or both of the control valves 314 and 414, by way of the respective product output conduits 120 and 220, connected thereto.

Figure 2:
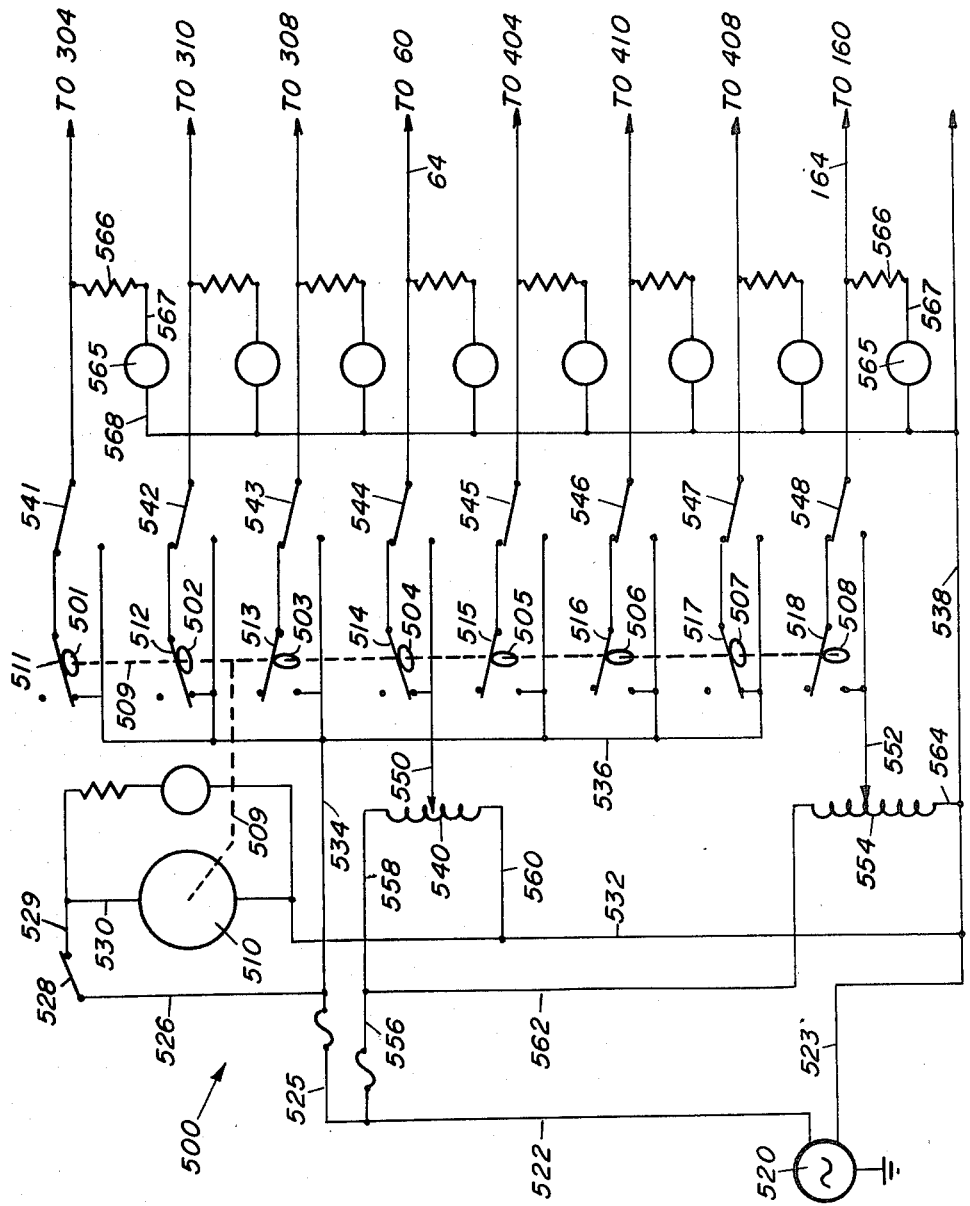
FIG. 2 is a schematic diagram of electrical circuitry and associated devices which constitute the program controller of the invention.

Operations in valve sets 300 and 302, and activations of heater devices 60 and 160, occur in response to the action of a cam controlled micro-switch arrangement 500, schematically represented in FIG. 2. Cams 501 to 508, inclusive, of this arrangement are positioned on a shaft of a linkage 509 which is driven by its connection to a controller-timer motor 510. Preset, single pole-double throw switches 511 to 518, inclusive, have switch arms disposed for displacement between fixed contacts of these switches by cams 501 to 508, respectively, in a conventional manner. Switches 511, 512, and 517 appear preset such that they initially complete circuits wherein the solenoids of valves 304, 310, and 408 are energized. However, solenoid actuation in valve 304, effects closure thereof whereas solenoids in valves 310 and 408 are actuated to attain the open condition of these valves. Further, at the start of the cyclic operation of the invention, to be hereinafter more fully explained, cam 504 is disposed to effect completion of a circuit wherein resistance wire 62 of heater 60 is energized. Energizing voltage for arrangement 500 is derived from an a-c source 520, and supplied between leads 522 and 523. Thus, energization of timer motor 510 is in a circuit traceable between the aforesaid supply leads on leads 525, 526, through an on-off switch 528, and leads 529 to 532, inclusive. A separate one of a set of manually operable, single pole-double throw switches 541 to 548, inclusive, is included in each of the cam controlled circuits of the valve solenoids and heaters. Thus, the aforesaid cam control can be over-ridden in any of the circuits by operating the related one of override switches 541 to 548 to open at one contact thereof the connection to the micro-switch arm, and complete at the other contact thereof a circuit directly leading to the voltage source.

Energization of the valve solenoids is accomplished in circuits traceable from voltage source 520 on leads 522, 525, 534, a cam switch bus lead 536, through micro-switches having connections to lead 536, the override switches, and on leads extending to the valves and back therefrom on a common return lead 538 to supply lead 523. Heaters 60 and 160 are energized by power applied in circuits similarly traceable with the exception that powerstats 540 and 554 are included by connections in parallel on leads 556, 558, 560, and 562, 564, across voltage supply leads 522 and 523. Micro-switches 514 and 518 for controlling the heater energizing circuits are in turn respectively connected to power take-off contact arms 550 and 552 of the respective power-stats instead of directly to source 520. Pilot lights such as lamp 565, and suitable voltage modifying resistances such as resistors 566 connected in series therewith by leads 567, are connected by way of a common lead 568 across the respective circuits of the several powered parts of the circuitry so as to provide indications of the activity of such parts.

Start-up for cyclic operation, and the subsequent repeated operational cyclings according to the invention are now explained with reference to the drawing including FIG. 3 showing a timing chart for a regular cycle of operation. Operational control cams 501 to 508 are originally fixed to shaft 509 at the positions indicated in FIG. 2, where the cams determine the setting of micro-switches 511 to 518, corresponding thereto, such that contact arms of micro-switches 517, 512, 511, and 514 are each in place for completing a circuit from power source bus lead 536 to valve actuators. The resulting solenoid actuations set valves 408 and 310 open, and valve 304 closed, while the concomitant energization of resistance wire 62 turns on heater 60. Valve 308 remains closed since its solenoid circuit is interrupted at micro-switch 513. Solenoid circuits are also interrupted at micro-switches 515, 516, and 518 with the result that normally open valve 404 stands open whereas valve 410 is closed and heater 160 is in its off condition. Container 18 is supplied with liquid nitrogen 250 to a level therein which just covers the shrouds at their necked-in portions, as appears in FIG. 1. Powerstat arm 550 is adjusted to raise the temperature in canister 42 to above 150° C. The heat thus achieved is maintained for about 5 hours during which time canister 42 is purged with helium being drawn through the system, including canister 142 and valve 420, at about 200 to 300 cm³ per minute. Temperatures in the respective columns are monitored separately by thermocouples appropriately affixed in contact with the outer walls of the respective canisters, and having electrical connections extending to remote meters (not shown). Heat added to column 10, as described, causes gaseous nitrogen to form, and since closed valve 304 blocks venting of the gas, liquid nitrogen is forced from annular spaces 86 and 88 and out of the open bottom of shroud 70. The resulting insulating shield between canister 42 and liquid nitrogen outside of shroud 70 allows column 10 to be heated to a temperature much above that of liquid nitrogen. It will also be recognized that upon heater 60 going to off when vent valve 304 opens, liquid nitrogen is allowed to rise inside the aforesaid annular spaces around shroud 70 such that canister 42 is again submerged in liquid nitrogen. This level rises to a height which is maintained in container 18 proper.

Helium for purging column 10, including canister 42, first enters at conduit 214 leading to open valve 408, and flows from there through conduits 208, 200 annular space 192, adsorbent 140, opening 194, conduits 190, 422, valve 420, conduits 424, and 90, opening 94, adsorbent 40, annular space 92, conduits 100, 110, and open valve 310, before exhausting out conduit 116. A purging with helium during a period of heating, as previously explained, in this instance particularly effects the removal of moisture and air from adsorbent 40 resulting from its exposure to air prior to the packing thereof in canister 42. This purging phase in column 10 is brought to completion when cams 501, 502, and 504 are driven to where energizing circuits through the related micro-switches 511, 512, and 514 are interrupted so as to allow the opening of valve 304, the closing of valve 310, and effect the deenergization turning off heater 60.

The program control is thereafter caused to advance its cams to where the micro-switch contacts displaced complete energizing circuits to supply 520 by way of micro-switches 513, 516, 515, and 518. Resultant solenoid actuations open valves 308 and 410, and close valve 404, at the same time heater 160 is turned on in column 12. Closure of valve 404 when heater 160 is energized gives rise to an accumulation under shroud 170 of gaseous nitrogen which forces liquid nitrogen from under the shroud. The insulation about canister 142 thus produced enables a build-up of temperature therein exceeding 150°C, which is best suited to proper purging of column 12 and reactivation of its adsorbent 140. A purging condition is maintained for about 5 hours with 200 to 300 cm³ per minute back flow of helium being supplied by way of open valve 308, passage through canister 42, and valve 420, in the conduits bridging the columns. Specifically, helium at valve 308 enters canister 42 from annular space 92, flows back through adsorbent 40 in this canister whereby purified helium passes by way of opening 94 and its conduit 90, conduits 424, 422, and valve 420 therein, conduit 190, out through opening 194, and through adsorbent 140, annular space 192, conduits 200, and 210, and exits through open valve 410. Thermocouples in contact with canister 142 permit temperatures therein to be monitored, as was hereinbefore explained in connection with canister 42. Once conditioned by the previously explained purging routine, the apparatus according to the invention is prepared for regular cyclic operations by an adjustment of needle valve 420 which limits backflow in either direction therethrough to approximately 100 cm³ per minute. The lessened backflow is suitable for the continuous cyclic operations of the apparatus now to be disclosed.

Regular operation of the disclosed embodiment is based on a 24 hour cycle wherein the invention achieves a continuous generation of helium with no detectable impurity. In each complete cycle both adsorption columns are used in purifying helium, one column after the other, and both columns are regenerated for further use, one column after the other. Accordingly, in every half cycle period one column operates to purify helium while the other is in a regeneration or regenerated mode, whereas in the following half cycle period these operational modes are reversed for the respective columns. Thus, following upon completion of a purifying operation in column 10, the regeneration mode is initiated therein. However, production of purified helium is stopped and the adsorbent is regenerated well in advance of the appearance of the first contaminant (neon) to break through the column. Break through times for neon can be determined in advance by continuous analysis of the helium emerging from the purifier. Only 80 percent or less of this neon breakthrough time is utilized to assure that neon is not allowed to elute from the column.

Reference to the functional indicators vertically below time designators $t_6$ and $t_7$ in the 24 hour cycle timing chart of FIG. 3, make evident a regeneration start-up in column 10 requiring closure of gas passages through valves 308, 304, and 410, and open passages for gas through valves 310, 408, and 404. In addition, heater 60 must turn on, whereas heater 160 stands off. The control exercised by the timed drive from motor 510 upon cams 501 to 508 is accordingly effective to program these cams for accomplishing the valve and heater conditions necessary for regeneration in column 10. This operative status is illustrated in FIG. 2 where cams are shown disposed to effect application of voltage supply 520 for energization of valve solenoids and a heater wire, by way of the respective micro-switches 511, 512, 514, and 517, and disconnect the voltage supply from solenoids and a heater wire at micro-switches 513, 515, 516 and 518. An approximately 5 minute delay in opening helium vent valve 310 after the closing of the helium input through valve 308, indicated by the distance from $t_6$ to $t_7$ in FIG. 3, is achieved in the usual manner by a relative disposition between the working surfaces on cams 502 and 503. This delay serves to insure that vent valve 310 is not opened before the closing of the helium feed valve 308 so as to prevent unnecessary losses of helium. Upon the start of regeneration in column 10, purification of helium is initiated in column 12 as the opening of valve 408, at time $t_6$ shown in FIG. 3, permits a supply of helium from conduit 214 to enter canister 142 by way of conduits 208 and 200, and annular space 192. Purification of the helium supplied proceeds forthwith since following an earlier regeneration of column 12 more than adequate time is provided in which temperature and pressure in canister 142 are brought to operating conditions, as will be hereinafter more fully explained. This appears from FIG. 3 which indicates that for the respective extended periods from times $t_4$ and $t_5$ up to time $t_6$, helium vent valve 410 stands closed to facilitate repressurization, and nitrogen vent valve 404 stands open to permit the retention of liquid nitrogen under shroud 170 which submerges and recools canister 142 during pressure build-up therein. However, before regular production cycles in which 1 ppb helium is delivered a number of automatic cycles are first permitted to occur. The extent of pre-production cycling is dependent on the operating line pressure as well as the contaminant content of the gas being processed. In exemplary applications of the invention to purify helium gas having about 15 parts per million of neon, operating line pressures of 165 psi and 500 psi required two and one-half, and three preparatory cycles, respectively.

A production run sequence of the present invention which follows the operational start-up and initiation of regeneration of column 10 together with helium purification in column 12, is hereinafter disclosed with particular reference to the timing chart of FIG. 3. In this sequence regeneration of column 10 commences when heater 60 becomes effective during the period starting at time $t_7$, and the needle valve 420 allows a reverse flow of purified helium drawn from column 12 to surge through column 10 as the latter is depressurized upon the opening of helium vent valve 310. The temperature produced by heater 60 generally does not exceed 0° C in normal operation. Although the use of as little heat as possible during regeneration is more efficient, a temperature as high as 150° C may occasionally be applied when required by gas flow conditions. Requisite backflow through needle valve 420 does not normally exceed 100 cm³ per minute, and therefore diverts only a small part of the purified gas product from column 12. Again referring to FIG. 1, this backflow during regeneration of column 10 is traceable from the supply thereof at helium inlet valve 408, through conduits 208, 200, annular space 192, the substance of adsorbent 140, conduit 190 by way of its opening 194, conduit 422, valve 420, conduits 424, 90 and its opening 94, the substance of adsorbent 40, annular space 92, and conduits 100 and 110 to helium vent valve 310, then open.

Regeneration of column 10 reaches completion at time $t_8$, shown in FIG. 3, when micro-switch 514 responds to displacement of cam 504, and interrupts the energizing circuit to heater 60. At time $t_{10}$, valve 304 is permitted to open as the action of cam 501 on micro-switch 511 effects the interruption of the valve solenoid energizing circuit. Venting of nitrogen gas through valve 304 allows liquid nitrogen to fill the void under shroud 70 and canister 42 is once more submerged in liquid nitrogen. Somewhat earlier, at time $t_9$ helium vent 310 closes upon interruption of its solenoid energizing circuit at micro-switch 512, with the result that pressure quickly builds-up to about 25 psig due to the backflow of purified gas from column 12. In the remainder of the half cycle ending at the time $t_{11}$, column 10 is cooled by liquid nitrogen which entered the bottom of shroud 70 as rapidly as vaporized nitrogen vented through valve 304. Adsorbent 40 is simultaneously repressurized with the purified helium flowing through needle valve 420, and an operating pressure near 150 psig is reached before column 10 is needed for the purification operation of the subsequent half of the cycle. Ultrapure helium produced in column 12 during the previously described regeneration of column 10, less the small amount used in the regeneration, exits the apparatus in conduit 190, passing through check valve 412 prior to being removed to instrumentation or storage by way of conduit 218, flow control valve 414, and conduit 220. Flow from conduit 218 into conduit 430 also supplies ultrapure helium to conduit 118 wherein control valve 314 is operable to permit delivery of the helium to output conduit 120 alone, or together with output in conduit 220.

Program control 500, now at time $t_1$ of the cycle illustrated in FIG. 3, functions to effect closure of column 12 helium feed valve 408 while opening helium feed valve 308 of column 10. Shortly thereafter, at time $t_2$, the program control acts further to close nitrogen vent valve 404 and open helium vent valve 410 at the same time heater 160 is turned on in column 12. Valves 304 and 310, previously set open and closed, respectively, remain unchanged. Column 10 now fully conditioned to produce ultrapure helium, commences to do so when helium flows through open valve 308 and is supplied to canister 42. On the other hand, canister 142, now further insulated by nitrogen gas in annular space 186, trapped by closed vent valve 404, undergoes heating by heater 160 in its thermowell 144. Reactivation of adsorbent 140 thus proceeds as helium produced in column 10 is bled from conduit 90 by way of valve 420, and channeled through canister 142 to carry gases driven out of adsorbent 142 through annular space 192 and out of the apparatus by way of valve 410 and conduit 216. Ultrapure helium product received through check valve 312, is delivered in conduit 118, and through flow control valve 314, to conduit 120, and concurrently or alternatively in conduits 430 and 218, and flow control valve 414, and conduit 220. Conduit connection 430 allows pressure in the ultrapure helium being continuously delivered by the apparatus to be equalized as well as its delivery from control valves 314 or 414 or both, at the operators discretion. However, at all times, even when valve operation changes the feed gas input from one source to another, purified gas is in a region never open to air. After the respective appropriate predetermined times $t_3$, $t_4$ and $t_5$, following the start of regeneration in column 12, heater 160 stands turned off, nitrogen vent valve 404 stands open to initiate recooling of canister 142, and valve 410 has closed to allow repressurizing of the column. Subsequently, the cycle continues following the regeneration and helium producing sequence of steps heretofore described in connection with column 10, and concludes at time $t_6$ when conditions in the columns start to reverse, as hereinbefore disclosed, for another cyclic operation.

In a further embodiment of the invention a control for intercolumnar valve 420 is programmed to enable a variable flow through that valve in accordance with the part of the regeneration cycle in effect. Thus, the control allows a suitably low flow to a canister during the heat purge portion of the cycle occurring therein, and an increase in flow to a canister following closure of its helium vent or discharge valve so as to allow a more rapid build up pressure in an activated canister. To this end valve 420 can be motorized so as to have requisite openings at preset times, or a second valve, automatically controlled by programming devices, can be connected in parallel with valve 420 and opened about the same time as the helium vent valves are closed. Somewhat better use of the purified helium for back purging is made possible under these conditions since the back flow through valve 420 has to be high enough to accomplish the repressuring of the activated column to near the operating line pressure before its next use. However, the repressuring flow is higher than needed for the back purge required for purging the impurities from the system, and although this is more of a problem at higher pressures it is not a detrimental factor in a practical operation.

The amount of highly purified helium produced is dependent upon the pressure at which helium is fed through the apparatus, as well as the chosen cycle time. Operating pressures as high as 1,750 psig can be used in the disclosed embodiment of the invention. Operation of this apparatus using a cycle time of 24 hours provided a continuous delivery of 175 cm³ per minute of ultrapure helium. When using a cycle time of 12 hours, other operating conditions remaining the same, a delivery of helium at 400 cm³ per minute can be achieved.

While a preferred form of the method and apparatus of the invention have been described and illustrated, it is to be understood that the invention is not limited thereby but is susceptible to changes in form and details.

What is claimed is:

1. Method for purifying helium by adsorption of the impurities therein comprising the steps of maintaining during a first interval of time first and second quantities of adsorbing agent at an effectively constant relatively low temperature and temperatures ranging from a relatively high temperature to said relatively low temperature, respectively, and during an immediately following second interval of time maintaining said first and second quantities of said adsorbing agent at temperatures ranging from said relatively high temperature to said relatively low temperature, and at said relative low temperature, respectively, supplying in each of said succeeding intervals of time a stream of feed helium for flowing contact with one of said first and second quantities of said adsorbing agent in accordance with which of said quantities is at said effectively constant relatively low temperature whereby said contacted adsorbing agent is effective to retain tightly impurities of said feed helium while gas of said feed helium passing through said contacted adsorbing agent is thereby produced as purified helium output, further supplying in each of said succeeding intervals a part of said purified helium output product for flowing contact with one of said first and second quantities of said adsorbing agent in accordance with which of the said quantities is at a temperature within said range of temperatures whereby in a first portion of said interval of time said helium product part contacts said adsorbing agent at a relatively high temperature and purges said adsorbing agent so as to reactivate said adsorbing agent, and in a second portion of said interval of time said helium product part contacts said adsorbing agent at temperatures including said relatively low temperature of said range of temperatures and develops a pressure upon said adsorbing agent in preparation for utilization thereof in said immediately following succeeding interval, and still further supplying the remainder of said helium product as a continuous stream thereof constituted by alternate outputs flowing from said contact with said first and second quantities of adsorbing agent.

2. The helium purification method of claim 1 wherein said feed helium comprises neon as a component of said impurities therein, and said intervals of time for said first and second quantities of adsorbing agent are determined so as to initiate in each instance said time interval for reactivation of an adsorbing agent quantity before a first component impurity of neon elutes during said interval of time in which said quantity is contacted with said feed helium to produce purified helium output.

3. The helium purification method of claim 1, having neon as a component of said impurities, and said first and second intervals of time thereof substantially of equal duration which is set to obtain reactivation following a production of purified helium before a first component impurity of neon elutes, and wherein said relatively high temperature is maintained in the respective quantities for a relatively short period of time during said intervals of time and said purging of said adsorbing agent occurs contemporaneously with said short time period during said intervals of time.

4. The helium purification method of claim 1 wherein said relatively low temperature is that of liquid nitrogen, and said relatively high temperature is approximately 0° C.

5. The helium purification method of claim 1 wherein said feed helium is supplied at approximately 100 cm$^3$ per minute, and at a pressure of 150 psig.

6. The helium purifying method of claim 1 wherein two consecutive of said intervals of time constitute a cycle of operation, during each said cycle said first and second quantities of adsorbing agent are sequentially effective to produce purified helium, and concurrently therewith said second and first quantities of adsorbing agent are sequentially purged.

7. Apparatus for purifying helium comprising first and second canisters, each packed with an adsorbent material and equipped with an internal heater operable to enable regeneration of said adsorbent material, first and second insulator receptacles open at the lower ends thereof and wherein said canisters are separately suspended in respective ones of said receptacles out-of-contact with surfaces of said receptacles, a plurality of means supporting by suspending connections therefrom said receptacles and canisters, means supporting said plurality of means and accommodating therein said suspension of receptacles and canisters, said accommodating means having liquid nitrogen therein at a level effectively covering said receptacle means, each said suspension having operatively associated therewith a plurality of conduit systems adapted to complete gas flow passages communicating a helium gas inlet device to an upper section of said canister, a helium gas outlet device to said upper section of said canister, and a nitrogen gas outlet device to a space between said receptacle and said canister, said conduit systems further operatively associating with each said canister for communication of a lower part therein with a product outlet conduit arrangement and a lower part in said other canister, and program control means connected to cause operation of said conduit system devices and heaters in said canister in a predetermined sequence whereby said adsorbent materials of said first and second canisters are separately, and in an alternate and uncomformable manner, active to enable purification of helium and subject to regeneration, respectively, while ultrapure helium is continuously produced as output from said product outlet conduit arrangement.

8. Helium purifying apparatus of claim 7 wherein said devices comprise solenoid actuated valves in said flow passages, said heaters comprise electrical resistance wires, and said program control means comprises a set of electrical switches separately connected in energizing circuits to said solenoid actuators and said heater wires, and timer driven cams corresponding to said switches and adapted by their positional presetting with respect to said switches to effect a predetermined sequential operation of said valves and said heaters.

9. Helium purifying apparatus of claim 7 wherein said nitrogen gas outlet device of each said canisters responds to said program control means by closing to prevent discharge of nitrogen gas therethrough when said heater of said canister functions to enable regeneration of said adsorbent material therein, whereby nitrogen gas accumulating in said space between said canister and said receptacle corresponding thereto is pressurized to where liquid nitrogen forced out from said space is replaced by nitrogen gas which constitutes an insulator shield around said canister during regeneration of said adsorbent material therein.

10. In a gas processing apparatus comprising a container storing liquid refrigerant up to a predetermined level therein, a cover attached to said container having secured therein means supporting enclosure vessels so as to depend from said cover into said liquid refrigerant, said vessels being packed with adsorbent material, means controlling the flow of feed gas through said vessels for processing therein and an output of processed gas from said vessels, and further means controlling a discharge from said container of gas arising from said liquid refrigerant, means maintaining said predetermined level of liquid refrigerant in said container including a liquid level sensor control for a switch actuator, said sensor control comprising a liquid level sensing end normally submerged in said liquid refrigerant, an intermediate part extending through said cover, and a pressure responsive flexible opposite end adapted to close a normally open electrical switch in response to heat applied to said sensor, a source of liquid refrigerant and conduit means connected thereto which passes through said cover and situates an outlet opening thereof adjacent said liquid level in said container, valve means determining the liquid flow in said conduit means comprising a normally deenergized solenoid, an energizing circuit for said solenoid completed by closure of said switch, a length of heat conductive material having one end affixed to said sensing end and held to said intermediate part so as to extend to a region in said container adjacent said cover, whereby a decrease in said liquid refrigerant level at said sensing end permits a rapid warming thereof by heat carried through said conductive material which produces a pressure increase closing said switch to energize said solenoid and opening said valve with the result that liquid refrigerant being supplied to the container raises the level of liquid therein to again submerge said sensing end of said sensor and return said switch and solenoid to normal.

* * * * *